United States Patent
Schumacher

(10) Patent No.: US 9,448,969 B2
(45) Date of Patent: Sep. 20, 2016

(54) TELECOMMUNICATION DEVICE CONFIGURED TO FORWARD VEHICLE INFORMATION FROM A MOBILE VEHICLE MONITORING DEVICE

(71) Applicant: Service Solutions U.S. LLC, Warren, MI (US)

(72) Inventor: Darren Schumacher, Ann Arbor, MI (US)

(73) Assignee: Bosch Automotive Service Solutions Inc., Warren, MI (US)

( * ) Notice: Subject to any disclaimer, the term of this patent is extended or adjusted under 35 U.S.C. 154(b) by 21 days.

(21) Appl. No.: 13/735,517

(22) Filed: Jan. 7, 2013

(65) Prior Publication Data

US 2014/0195108 A1     Jul. 10, 2014

(51) Int. Cl.
*G06F 17/00* (2006.01)
*G07C 5/00* (2006.01)

(52) U.S. Cl.
CPC .............. *G06F 17/00* (2013.01); *G07C 5/008* (2013.01)

(58) Field of Classification Search
CPC ......... G06F 7/00; G06F 19/00; G06Q 40/00; F02D 43/00
See application file for complete search history.

(56) References Cited

U.S. PATENT DOCUMENTS

| | | | |
|---|---|---|---|
| 6,389,337 B1* | 5/2002 | Kolls | 701/31.6 |
| 2005/0065678 A1* | 3/2005 | Smith | G07C 5/008 701/31.4 |
| 2008/0140435 A1* | 6/2008 | Arakawa | E02F 9/26 705/1.1 |
| 2011/0054768 A1* | 3/2011 | Sullivan | 701/123 |
| 2011/0153367 A1* | 6/2011 | Amigo et al. | 705/4 |
| 2011/0276218 A1 | 11/2011 | Dwan et al. | |
| 2012/0010775 A1 | 1/2012 | Chenn | |
| 2012/0252364 A1 | 10/2012 | Inabathuni et al. | |

* cited by examiner

*Primary Examiner* — John R Olszewski
*Assistant Examiner* — Jason Roberson
(74) *Attorney, Agent, or Firm* — Baker Hostetler LLP

(57) ABSTRACT

The present invention is directed a system including a vehicle monitoring device coupled to a vehicle configured to retrieve vehicle information from a vehicle diagnostic system of the vehicle and transmit the vehicle information to an off-board device via a communication relay device to receive the vehicle information and display the received vehicle information based at least in part on information of the one or more recipients.

20 Claims, 4 Drawing Sheets

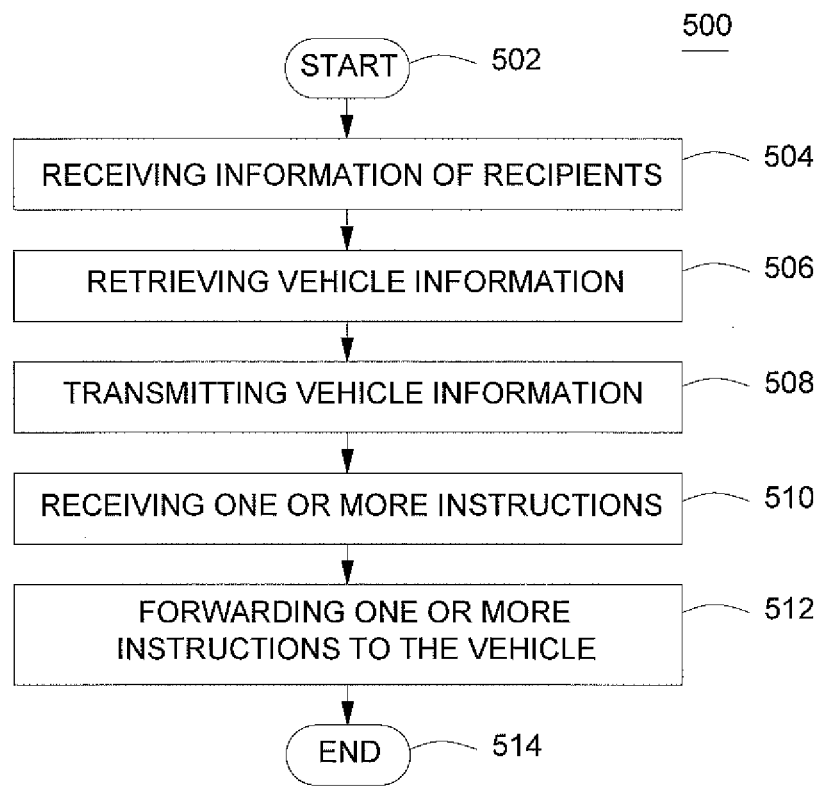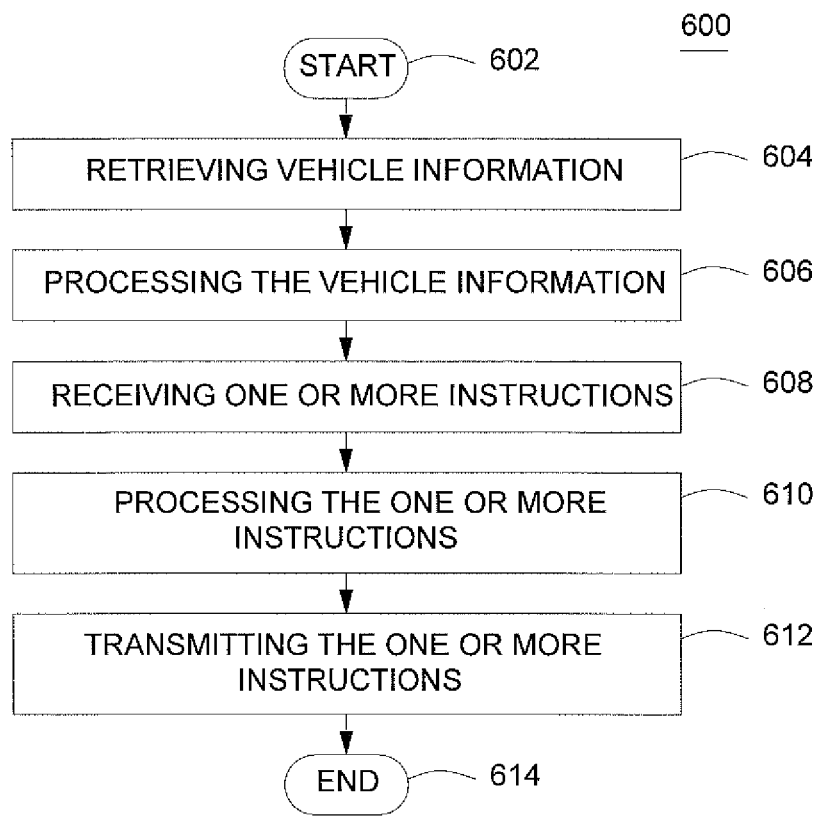

TELECOMMUNICATION DEVICE CONFIGURED TO FORWARD VEHICLE INFORMATION FROM A MOBILE VEHICLE MONITORING DEVICE

FIELD OF THE INVENTION

The disclosure relates generally to a vehicle monitoring system, and, more particularly, to a vehicle monitoring system that may include a cellular phone configured to connect to a vehicle monitoring device to forward vehicle information to an off-board device.

BACKGROUND OF THE INVENTION

Modern vehicles typically have a vehicle diagnostic system, including one or more separate computer control modules. Examples of such computer control modules (also known as just "modules") are: a powertrain control module (PCM), an engine control module (ECM), a transmission control module (TCM), an ABS control module, and an air bag control module.

"Off-board devices," such as cellular telephones, computers, scan tools and code readers are known in the art. Scan tool and code reader testing devices interface with vehicle diagnostic systems to, e.g., access, display, and/or print vehicle diagnostic information. OBD II (On-Board Diagnostics version II) Scan Tools are one commonly known type of scan tool and are governed by a number of standards, e.g., SAE J1978 Rev. 1998-02 and SAE J1979 Rev. 1997-09. Scan tools are relatively expensive diagnostic devices that have a relatively large number of features and are typically marketed to professional automobile mechanics and service stations. Scan tools are generally considered to be beyond the means of most automobile hobbyists and the ordinary individual interested in performing simple maintenance or service of a few vehicles, such as a family "fleet" of vehicles.

One expense involved in manufacturing scan tools is the costs of the parts, such as the processor, circuit boards, display, housing and input keys. Another expense associated with scan tools is the software that needs to be installed on the device. There are many different makes and models of automobiles, many of which have specialized codes and error messages. In addition, since vehicle manufacturers add new equipment, codes and faults, it is often necessary to update the software to include the new codes and faults every time a new model year is introduced. Further, most scan tools are equipped to handle the communications protocols and error/fault messages of most, if not all, of the vehicles on the market. This requires the scan tool to store a large number of error/fault codes and many different communications protocols. As a result, the cost of the scan tool is beyond the reach of the average back yard mechanic, who only has one or two automobiles.

Accordingly, it is desirable to provide a method and system that efficiently transfer the vehicle information to an off-board device for interpretation. Also, it is desirable to provide an off-board device that may control a performance of a vehicle based on the vehicle information.

SUMMARY OF THE INVENTION

The present disclosure is directed toward a system and a method for forwarding vehicle information to an off-board device via a communication relay device.

In an embodiment, a system for forwarding vehicle information may include a processor configured to retrieve vehicle information from a vehicle diagnostic system and a memory configured to store information of one or more recipients of the vehicle information selected by a user. Also, the system for forwarding vehicle information may include a communications circuit configured to transmit the vehicle information to an off-board device of the one or more recipients selected by the user via a communication relay device based at least in part on the information of the one or more recipients.

In another exemplary embodiment, a method of forwarding vehicle information may include receiving information of one or more recipients of the vehicle information selected by a user and retrieving, via a processor, the vehicle information from a vehicle diagnostic system of a vehicle. The method of forwarding vehicle information may also include transmitting, via a communication circuit, the vehicle information to an off-board device of the one or more recipients selected by the user via a communication relay device and receiving one or more instructions from the off-board device via the communication relay device to change an operation of the vehicle, wherein the one or more instructions are based at least in part on the vehicle information.

In other exemplary embodiments, a system for forwarding vehicle information may include a processor configured to receive one or more instructions to change an operation of a vehicle based at least in part on the vehicle information and a memory configured to store the one or more instructions and the vehicle information, wherein the memory is in communication with the processor. The system for forwarding vehicle information may also include an instruction interface configured to process instructions from the processor and a communications circuit configured to transmit the one or more instructions to a vehicle monitoring device via a communication relay device.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

In the accompanying drawings, which are incorporated herein and constitute a part of this specification, embodiments of the invention are illustrated, which, together with a general description of the invention given above, and the detailed description given below, serve to example the principles of this invention, wherein:

FIG. 5 is a flow diagram of forwarding vehicle information in accordance with an embodiment of the present disclosure.

FIG. 6 is a flow diagram of forwarding instructions based on the vehicle information in accordance with an embodiment of the present disclosure.

DETAILED DESCRIPTION

In general, the present disclosure may be directed to a vehicle monitoring system that may include a vehicle monitoring device that may be an interface between a communication relay device (e.g., a smart phone) having a processor and a vehicle data link connector (e.g., a wired connection, a wireless connection, or a near-field communication (NFC)). The vehicle monitoring device may be coupled to a vehicle diagnostic system of a vehicle via the vehicle data link connector. The vehicle diagnostic system may collect and store vehicle information and provide the vehicle information to the vehicle monitoring device via the vehicle data link connector. The vehicle monitoring device may continuously or intermittently transmit vehicle information to the smart phone and/or an off-board device.

The vehicle monitoring device may transmit the vehicle information to one or more off-board devices via the communication relay device. For example, the communication relay device may be in communication with the vehicle monitoring device and receive vehicle information from the vehicle monitoring device. The communication relay device may transmit the vehicle information to one or more off-board devices. In an exemplary embodiment, the vehicle monitoring device may provide vehicle information to a smart phone of the driver of the vehicle. Oftentimes, the driver of the vehicle may not understand or able to decipher the vehicle information and thus, the vehicle information may be provided to one or more off-board device via the cellular phone to diagnose the vehicle.

The off-board device or the communication relay device may provide instructions to the vehicle monitoring device to perform various functions. For example, the vehicle monitoring device may execute diagnostic tests specified by the smart phone or the off-board device. In another example, the vehicle monitoring device may control an operation of the vehicle (e.g., accelerate, decelerate, stop, etc.) specified by the smart phone or the off-board device.

As discussed earlier, most modern vehicles have one or more computer modules that are linked together along a common data bus. The modules and common data bus together form the vehicle diagnostic system. Vehicles equipped with vehicle diagnostic systems generally have a data link connector located in the occupant compartment of the vehicle, however, data link connectors can be located anywhere on the vehicle. The purpose of the data link connector is to facilitate the connection of the off-board device (e.g., a scan tool) that can be used to read the error/fault codes that are generated by the vehicle computer modules.

Figure 1:
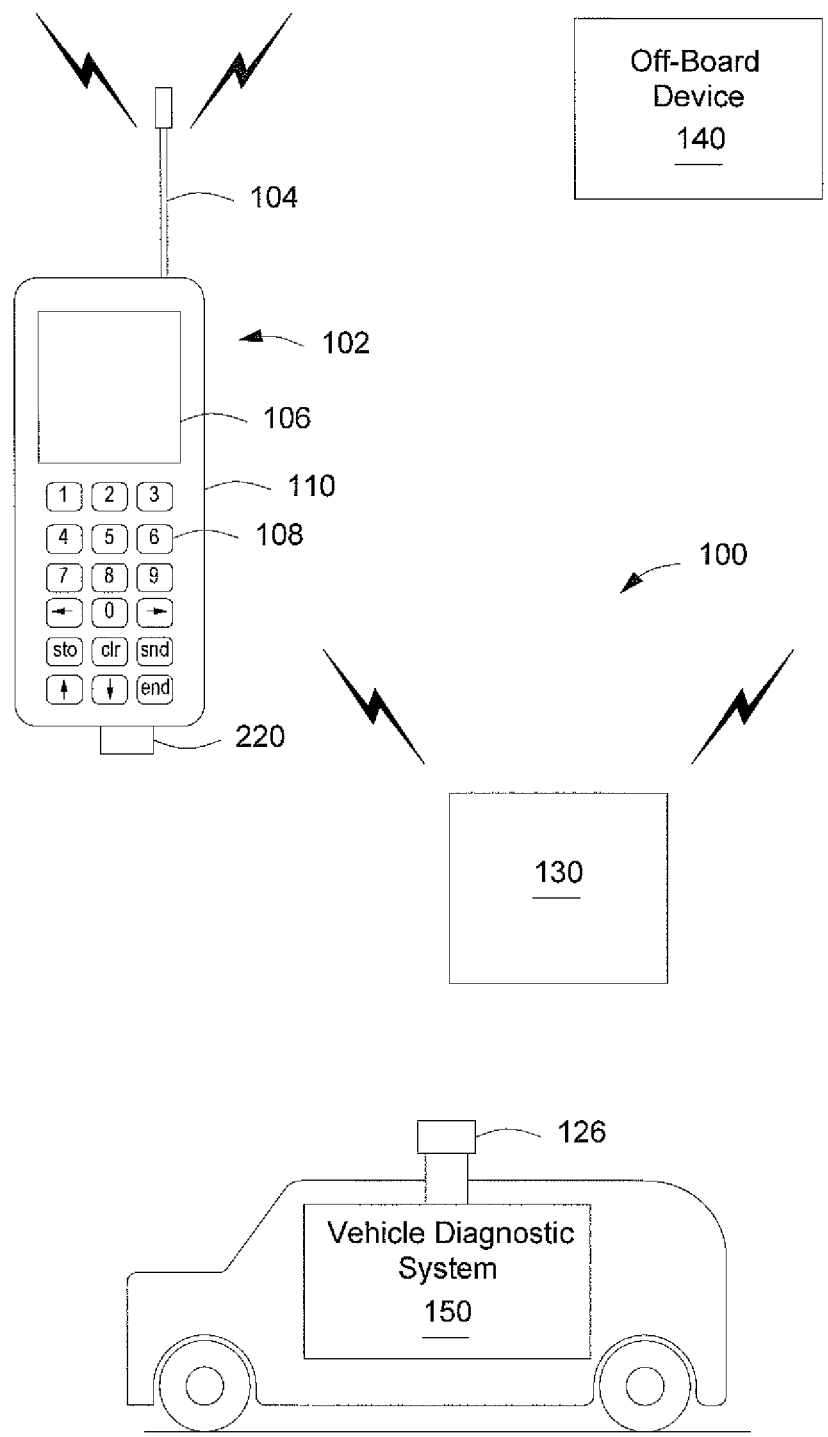
FIG. 1 is a schematic view of a communication system for forwarding vehicle information in accordance with an embodiment of the present disclosure.

FIG. 1 is a communication system 100 to forward vehicle information in accordance with one embodiment of the present disclosure. The communication system 100 may include a communication relay device 102, a vehicle monitoring device 130, an off-board device 140 and a data link connector (DLC) 126 that can all in circuit communication with a vehicle diagnostic system 150.

The communication relay device 102, as will be described in more detail below, includes a housing 110, an antenna 104, a display 106, a plurality of input keys 108, and an interface port 220. The interface port 220 can be any type of communications interface port, such as a serial port, a USB port, an infrared port, an RS 232 port, a port that is proprietary to the manufacturer of the communication relay device 102, or any other conventional communications port.

The communication relay device 102 may be a mobile device, a cellular communication device, a smart phone, a computer, a personal computer, a laptop, a workstation, a phone, a television, a handheld PC, a personal digital assistant (PDA), a thin client, a fat client, a network appliance, a tablet, a gaming console, a wearable mounted device, or any other device that may be in communication with the vehicle monitoring device 130 and/or the off-board device 140. Other communication relay device 102 may be an intermediary device that may communicate with the off-board device 140, such as a transmitter/receiver, router, modem, or a set-top box. The communication relay device 102 may be coupled to the vehicle monitoring device 130 and/or the off-board device 140 via a wired connection. In another exemplary embodiment, the communication relay device 102 may be coupled to the vehicle monitoring device 130 and/or the off-board device 140 via a wireless connection. The vehicle monitoring device 130 may be connected to the vehicle diagnostic system 150 via a DLC 126.

The off-board device 140 may be computing devices or mobile devices. The off-board device 140 may be any computing device, including a computer, a personal computer, a laptop, a cellular communication device, a workstation, a mobile device, a smart phone, a television, a handheld tablet, a personal digital assistant (FDA), a thin client, a fat client, a network appliance, an Internet computing device, a gaming console, a wearable mounted device, or other any other device. The off-board device 140 may include software implemented on the computing device in order to receive vehicle information from the communication relay device 102 and/or the vehicle monitoring device 130. In an exemplary embodiment, the off-board device 140 may interpret diagnostic trouble codes (DTC) using, for example, a database such as Identifix Direct Hit Technician, and provide a failure/repair message including the likely fixes for the diagnostic trouble codes (DTC) to the communication relay device 102. The DTC and the VIN (vehicle identification number) may be sent together or alternatively, the DTC may be sent by itself particularly if the DTC is specific for a certain make or model vehicle. In another example, the off-board device 140 may be, for example, the Genisys® diagnostic tool from Service Solutions U.S. LLC in Owatonna, Minn. or Elite Autoscanner® Pro CP9190 from Actron (a unit of Service Solutions).

Figure 2:
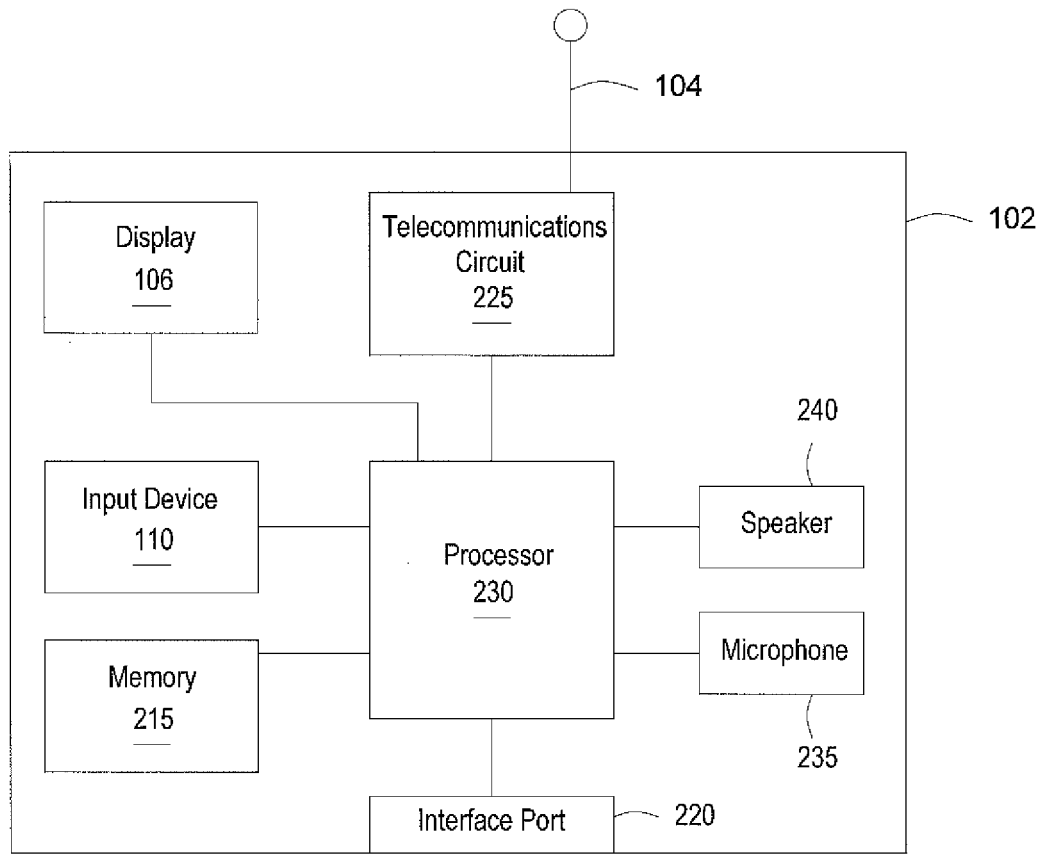
FIG. 2 a block diagram of components of a communication relay device according to an embodiment of the present disclosure.

FIG. 2 is a block diagram of components of a communication relay device 102 according to an embodiment of the present disclosure. For example, the communication relay device 102 includes a display 106, at least one input device 110, a memory 215, an interface port 220, a speaker 240, a microphone 235, and an antenna 104, all in communications with at least one processor 230. Typically the display 106 is a liquid crystal display (LCD), however the display can be one or more of virtually any type of display, e.g., textual displays (such as n character by m line LCD or plasma displays, etc.), binary displays (such as LEDs, lamps, etc.), graphical displays (such as LCD displays that can display text and bar graphs and the like), etc.

The input device 110 can be any number of different inputs devices, including, but not limited to, one or more keys 108 (FIG. 1), a thumb wheel (not shown) that permits a user to quickly scroll through a list of options, a four-direction cursor controller, a touch screen, a voice activated input, or any combination thereof. The memory 215 permits the user to store information, such as names and phone numbers, that do not get erased when the battery is removed from the communication relay device 102 for short periods of time, and permits the communication relay device 102 service provider to update the programming as required. The communication relay device 102 may include a telecommunications circuit 225 for establishing a connection to a cellular tower, a Wi-Fi network, a hotspot network, or a cloud network and transmitting and receiving data via the antenna 104. The telecommunications circuit 225 may be used to transmit vehicle information to the off-board device 140. The speaker 240 and the microphone 235 are shown connected to the processor 230, however, the speaker 240 and microphone 235 may be connected to the telecommunications circuit 225. Data representing a human voice is transmitted to the speaker 240 by either the telecommunications circuit 225 or the processor 230, wherein the data is communicated to a user in human hearable form. The microphone 235 transmits data representing a human voice to either the telecommunications circuit 225 or the processor 230. Data representing a human voice may be transmitted/received by the telecommunications circuit 225 to/from a remote location.

A user of the communication relay device 102 may configure the communication relay device 102 to transmit the vehicle information to one or more recipients. For example, the user may use input device 110 to input information of various recipients into the communication relay device 102. In another embodiment, the recipient may be selected from an address book stored on the communication relay device 102. The user may transmit the vehicle information to the various recipients based at least in part on the information. The user of the communication relay device 102 may configure the communication relay device 102 to transmit the vehicle information to a relative of the user, an automotive technician, department of motor vehicles, manufacturers, insurance companies, data collection organizations and/or any other authorized recipient.

The telecommunications circuit 225 may encrypt the vehicle information received from the vehicle monitoring device 130. For example, the telecommunications circuit 225 may encrypt with vehicle information with a public or private encryption keys. Also, the telecommunication circuit 225 may encrypt the vehicle information with a password designated by a user. Further, the telecommunication circuit 225 may generate a code that may be used to encrypt the vehicle information. The telecommunications circuit 225 may transmit the encrypted vehicle information to a plurality of recipients configured by a user. The telecommunications circuit 225 may encrypt the vehicle information differently to different recipients configured by a user.

In addition, the communication relay device 102 may include an interface port 220. The interface port 220 permits the user to connect the communication relay device 102 to other devices, such as the vehicle monitoring device 130, the off-board device 140, a computer, in order to perform functions such as downloading new programming information, downloading sound bites, and connecting other peripheral devices. The interface port 220 can be any type of communications interface port, such as a serial port, a USB port, an infrared port, an RS 232 port, an Ethernet port, a port that is proprietary to the manufacturer of the communication relay device 102, or any other conventional communications port or wireless link, such as Bluetooth communications link. Data transferred between the communication relay device 102, vehicle monitoring device 150 and vehicle diagnostic system may be established via other contact or contactless communication, such as near-field communication (NFC).

Figure 3:
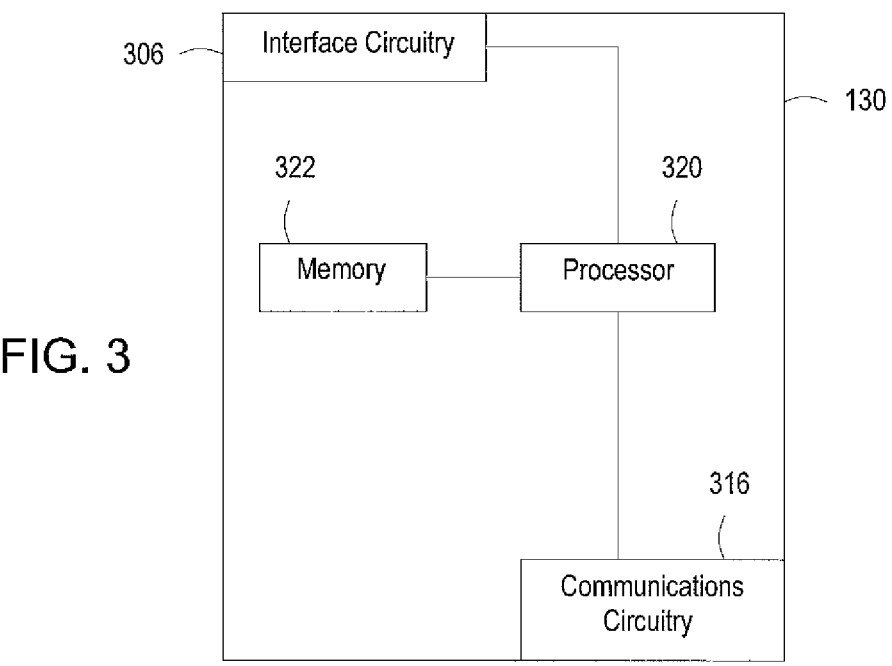
FIG. 3 is a block diagram of the components of a vehicle monitoring device in accordance with an embodiment of the present disclosure.

FIG. 3 is a block diagram of the components of a vehicle monitoring device 130 in accordance with an embodiment of the present disclosure. The vehicle monitoring device 130 may include communications circuitry 316 and an interface circuitry 306 in communication with a computer processor 320. The computer processor 320, also referred to herein as just processor 320, may be one of virtually any number of processor systems and/or stand-alone processors, such as microprocessors, microcontrollers, and digital signal processors, and has associated therewith, either internally therein or externally in communication therewith, associated RAM, ROM, EPROM, clocks, decoders, memory controllers, and/or interrupt controllers, etc. (all not shown) known to those in the art to be needed to implement a processor circuit. The computer processor 320 may be in communication with the communications circuit 316. The communications circuitry 316 and the interface circuitry 306 are illustrated to be configured inside the vehicle monitoring device 130 for convenience purposes only and it should be obvious to one skilled in the art that the circuitry could be located outside the vehicle monitoring 130 in a number of convenient locations.

The communications circuit 316 may transmit vehicle information in one or more communications protocols with which the communication relay device 102 and the vehicle computer network communicate with one-another. For example, the communications circuit 316 may translate the vehicle information from a first communication protocol (e.g., SAE standards) to a second communication protocol (e.g., wireless standards). The communications circuit 316 can be implemented either in hardware, or in software, or in a combination of hardware and software. Typical communications protocols generated by the communication circuit 316 may include, but are not limited to: SAE J1850 (VPM), SAE J1850 (PWM), ISO 9141-2, and ISO 14230-4 ("Keyword 2000"). The present disclosure is not intended to be limited to any specific communications protocol, or even to electrical communications protocols. Other present and future protocols, such as fiber optic, ISO 15765-4, MS CAN, HS CAN and wireless communications protocols such as Bluetooth protocols and 802.11 protocols, are also contemplated as being within the spirit and scope of the present disclosure.

A user of the vehicle monitoring device 130 may configure the vehicle monitoring device 130 to transmit the vehicle information to one or more recipients. For example, the user may configure the communication circuit 316 to transmit the vehicle information to one or more recipients. The user may configure the communication circuit 316 to transmit the vehicle information to a relative of the user, an automotive technician, department of motor vehicles, manufacturers, insurance companies, data collection organizations and/or any other authorized recipient.

The communication circuit 316 may encrypt the vehicle information. For example, the communication circuit 316 may encrypt with vehicle information with a public or private encryption keys. Also, the communication circuit 316 may encrypt the vehicle information with a password designated by a user. Further, the communication circuit 316 may generate a code that may be used to encrypt the vehicle information.

The interface circuitry 306 may permit the vehicle monitoring device 130 to be connected to the interface port 220 of the communication relay device 102. The interface circuitry 306 can be any type of communications interface circuitry port, such as a serial port, a USB port, an infrared port, an RS 232 port, an Ethernet port, a port that is proprietary to the manufacturer of the vehicle monitoring device 130, or any other conventional communications port or wireless link, such as Bluetooth communications link or NFC.

The vehicle monitoring device 130 may include a memory 322 that may be separate from the computer processor 320, but still in communications with the computer processor 320. The memory 322 may be a random access memory (RAM). The memory 322 may store information of one or more recipients of the vehicle information selected by a user. The vehicle monitoring device 130 may include scan tool software, error/fault codes, communications protocols etc. and simply communicate to the results of the diagnostic tests in a format corresponding to the diagnostic information to the communication relay device 102 and/or the off-board device 140 for display. The vehicle monitoring device 130 may control an operation of a vehicle. For example, the vehicle monitoring device 130 may accelerate the vehicle, decelerate the vehicle, gear shifts, control indicator signals, lights, radios, A/C systems, defogging system, navigation system, mirrors and/or other components of the vehicle. In other examples, the function of the vehicle monitoring device 130 may include communications translator, wherein the communication relay device 102 and/or the off-board device 140 may generate the communications protocol, transmits the communications to the vehicle monitoring device 130. The vehicle monitoring device 130 may receive the communications and passes the communications over a data link connector (DLC) 126 to the vehicle.

The vehicle monitoring device 130 as described above may be a relatively intelligent vehicle monitoring device 130. The functions described above, however, can be performed in the communication relay device 102 and/or the off-board device 140, modified in accordance with the teachings of the present disclosure. Thus, the vehicle monitoring device 130 may be a pass through device to place the communication relay device 102 and/or the off-board device 140 in communication with the vehicle, or eliminated entirely by using wireless communications.

Further, the vehicle monitoring device 130 may not be in a separate device and can be built into the communication relay device 102 wherein the user simply needs to connect the communication relay device 102 to the vehicle data link 126. Thus, the vehicle monitoring device 130 may include a cable with a connector on each end. One of the connectors connects to the communication relay device 102, and one connector, such as a DLC 126 connects to the vehicle. In addition, vehicle manufacturers may eliminate the data link connectors located in the occupant compartment, and replace the data link connector with a wireless communicator. It is within the spirit and scope of this disclosure that the cellular phone 102 can be connected to the vehicle diagnostic system by a wireless communications port.

Figure 4:
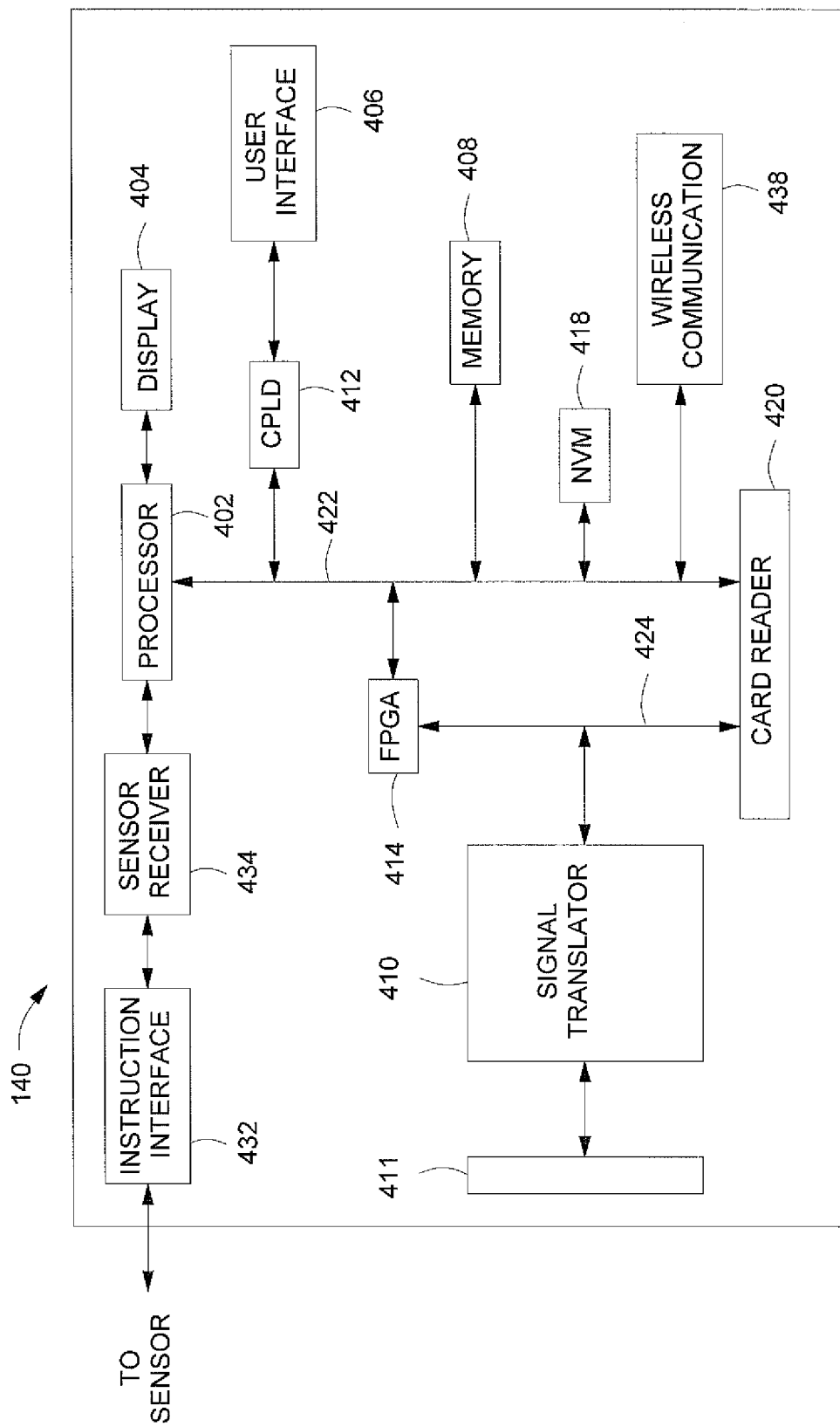
FIG. 4 is a block diagram of the components of the off-board device 140 according to an embodiment of the present disclosure.

FIG. 4 is a block diagram of the components of the off-board device 140 according to an embodiment of the present disclosure. In FIG. 4, the off-board device 140 may include a processor 402, a field programmable gate array (FPGA) 414, a first system bus 424, the display 404, a complex programmable logic device (CPLD) 412, the user interface in the form of a user interface 406, a memory subsystem 408, an internal non-volatile memory (NVM) 418, a card reader 420, a second system bus 422, a connector interface 411, a selectable signal translator 410, an instruction interface 432 and wireless communication circuit 438.

Selectable signal translator 410 may communicate with the vehicle monitoring device 130 through the connector interface 411 via a wired communication or the wireless communication circuit 438. Signal translator 410 may condition signals received from the vehicle monitoring device 130 to a conditioned signal compatible with the off-board device 140. Signal translator 410 can communicate with, for example, the following communication protocols: J1850 (VPM and PWM), ISO 9141-2 signal, communication collision detection (CCD) (e.g., Chrysler collision detection), data communication links (DCL), serial communication interface (SCI), S/F codes, a solenoid drive, J1708, RS232, Controller Area Network (CAN), Keyword 2000 (ISO 14230-4), OBD II or other communication protocols that are implemented in a vehicle.

The circuitry to translate and transmit in a particular communication protocol may be selected by FPGA 414 (e.g., by tri-stating unused transceivers) to communicatively connect the off-board device 140 to the vehicle monitoring device 130. Signal translator 410 may be coupled to FPGA 414 and the card reader 420 via the first system bus 424. FPGA 414 may transmit to and receive signals (i.e., messages) from the vehicle monitoring device 130 through signal translator 410.

The FPGA 414 is coupled to the processor 402 through various address, data and control lines by the second system bus 422. FPGA 414 may be also coupled to the card reader 420 through the first system bus 424. The processor 402 is also coupled to the display 404 in order to output the desired information to the user. The processor 402 communicates with the CPLD 412 through the second system bus 422. Additionally, the processor 402 is programmed to receive input from the user through the user interface 406 via the CPLD 412. The CPLD 412 may provide logic for decoding various inputs from the user of the off-board device 140 and also provide glue-logic for various other interfacing tasks.

Memory subsystem 408 and internal non-volatile memory (NVM) 418 are coupled to the second system bus 422, which may allow for communication with the processor 402 and FPGA 414. Memory subsystem 408 may include an application dependent amount of dynamic random access memory (DRAM), a hard drive, and/or read only memory (ROM). Software to run the off-board device 140 may be stored in the memory subsystem 408, including any database. The database may include data for monitor vehicle information and provide instruction to the vehicle monitoring device 130 to perform various functions. The database may include data for tuning or servicing (including diagnosing) a vehicle at various altitudes or regions. Because vehicles run differently (for example, oxygen levels vary at different altitudes) at different altitudes or regions, moving a vehicle (such as a racing vehicle) from one altitude to another or from one region (hot) to another region (cold) will require tuning the vehicle to that changed altitude and/or region. The database can also be stored on an external memory, such as a compact flash card or other memories. In an embodiment, the database may be stored on the communication relay device 102.

The database may also include data for providing instructions to the vehicle monitoring device 130 to perform one or more functions. For example, the database may include instructions to an engine of the vehicle to accelerate or decelerate the vehicle. The database may include instructions to a navigation system of the vehicle to input and/or change destinations. The database may include instructions to an entertainment system of the vehicle to control volume, settings, operation mode of the entertainment system. The database may include instructions to a lighting system of the vehicle to control exterior lights and interior lights of the vehicle. The database may include instructions to a transmission system of the vehicle in order to control application of power. The database may include instructions to control panels of the vehicle to control one or more control indicator signals of the vehicle.

Internal non-volatile memory 418 can be an electrically erasable programmable read-only memory (EEPROM), flash ROM, or other similar memory. Internal non-volatile memory 418 can provide, for example, storage for boot code, self-diagnostics, various drivers and space for FPGA images, if desired. If less than all of the modules are implemented in FPGA 414, memory 418 can contain downloadable images so that FPGA 414 may be reconfigured for a different group of communication protocols.

The instruction interface 432 may communicate various signals representing different instructions to the communication relay device 102 and/or the vehicle monitoring device 130. The instruction interface 432 may provide a unified interface with various types of communication relay device 102 and/or the vehicle monitoring device 130. For example, the instruction interface 432 may provide a unified interface with Android® operating system and/or iOS® operating system hosted by the communication relay device 102. Also, the instruction interface 432 may provide a unified interface with various types of vehicle monitoring devices 130. In another example, the instruction interface 432 may transmit various signals to different types of communication relay device 102 (e.g., 3G signals, 4G signals, or 4G LTE signals). Various signals may be in the form of an optical or electrical signal and may be either digital or analog signals depending on the communication relay device 102 and/or the vehicle monitoring device 130. The instruction interface 432 may process the various signals into a standard format before transmission.

The instruction interface 432 may be electronically coupled to the processor 402, which may be coupled to memory 408, non-volatile memory (NVM) 418 or a memory card in the card reader 420. The instruction interface 432 may receive signals representing instructions from the processor 402. The processor 402 may process the instruction signals to transmit to the communication relay device 102 and/or the vehicle monitoring device 130 based at least in part on an input received from the user interface 406. The memory 408 may store instructions received from the user via the user interface 406. Also, the memory 408 may store instructions to be transmitted to the communication relay device 102 and/or the vehicle monitoring device 130.

Wireless communication circuit 438 communicates with the processor via second bus system 422. The wireless communication circuit 438 may be configured to communicate to RF (radio frequency), satellites, cellular phones (analog or digital), Bluetooth®, Wi-Fi, Infrared, Zigby, Local Area Networks (LAN), WLAN (Wireless Local Area Network), NFC, ANT, or other wireless communication configurations and standards. The wireless communication circuit 438 may allow the off-board device 140 to communicate with the communication relay device 102, the vehicle monitoring device 130 and/or other devices wirelessly. The wireless communication circuit 438 may include an antenna (not shown) built therein or can be externally located.

The wireless communication circuit 438 may receive vehicle information from the communication relay device 102 and/or the vehicle monitoring device 130. In an exemplary embodiment, the wireless communication circuit 438 may receive the vehicle information from the vehicle monitoring device 130 via the communication relay device 102. In another exemplary embodiment, the wireless communication circuit 438 may receive vehicle information directly from the vehicle monitoring device 130. The wireless communication circuit 438 may provide the vehicle information to the processor 402 to process the vehicle information. The processor 402 may provide the vehicle information to the display 404 to be displayed to the user. The user may provide instructions to the off-board device 140 based at least in part on the displayed vehicle information.

The wireless communication circuit 438 may decrypt the vehicle information received from the communication relay device 102 and/or the vehicle monitoring device 130. For example, the wireless communication circuit 438 may store a public or private encryption keys in order to decrypt the received vehicle information. Also, the wireless communication circuit 438 may store a password designated by a user in order to decrypt the received vehicle information. Further, the wireless communication circuit 438 may generate a code that may be used to decrypt the received vehicle information.

A diagnostic software may be installed to operate the off-board device 140 (e.g., processor 402) to perform the various diagnostic tests. Different vehicle manufactures (or even within the same manufacture) may require the off-board device 140 to operate using different programs and communication protocols. The off-board device 140 may determine whether it is operating the correct software or program for a particular vehicle by comparing the vehicle type with the program currently running on the off-board device 140. The vehicle type may be inputted into the off-board device 140 through the user interface 406 in a manner such as, for example, scanning a bar coded VIN number located on the vehicle to be serviced, reading a radio frequency identification (RFID) device, or communicating with a wireless device of the vehicle. Also, the vehicle type may be manually inputted into the off-board device 140 through the user interface 406 in a manner such as, manually entering the VIN number, manufacturer, model, year, make. In other examples, the vehicle information received from the communication relay device 102 and/or the vehicle monitoring device 130 may be used to determine a vehicle type. From the vehicle information, the off-board device 140 can then determine whether it is presently running the necessary program to service the vehicle.

For example, the off-board device 140 may display various vehicle information provided by the communication relay device 102 and/or the vehicle monitoring device 130. The vehicle information may be transmitted to an authorized user by the communication relay device 102 and/or the vehicle monitoring device, as further discussed below. For example, the off-board device 140 may display a speed, revolution per minute (RPM), oil, temperature, tire pressure, engine oil, battery, child lock, mirrors, shift gear, lighting, warning indicator signals, navigation system, entertainment system, anti-theft system, windows, camera system and/or other operational information of the vehicle. In another example, the off-board device 140 may display diagnostic results of the vehicle including fault codes, failures, and/or other diagnostic results performed by the vehicle diagnostic system 150.

FIG. 5 is a flow diagram of forwarding vehicle information in accordance with an embodiment of the present disclosure. This exemplary method 500 may be provided by way of example, as there are a variety of ways to carry out the method. The method 500 shown in FIG. 5 can be executed or otherwise performed by one or a combination of various systems. The method 500 is described below may be carried out by the apparatus and components shown in FIGS. 1-4, by way of example, and various elements of the apparatus are referenced in explaining the example method of FIG. 5. Referring to FIG. 5, a block 502, the method 500 for forwarding vehicle information may begin.

At block 504, receiving information of one or more recipients of the vehicle information. For example, a user may input information of one or more recipients of the vehicle information and stored by the vehicle monitoring device 130. The user may input names, mailing addresses, relationship, telephone numbers, Internet Protocol (IP) addresses, media access control (MAC) addresses and/or other information of the one or more recipients of the vehicle information. The user may configure the vehicle monitoring device 130 to provide the vehicle information to various recipients based at least in part on the information of the one or more recipients.

At block 506, the vehicle monitoring device 130 may retrieve vehicle information. For example, the vehicle monitoring device 130 may be coupled to vehicle diagnostic system 150 via DLC 126. The vehicle monitoring device 130 may retrieve vehicle information from the vehicle diagnostic system 150 and other measurement devices of the vehicle. For example, the vehicle information may include data about speed, revolution per minute (RPM), fluids, temperature, tire pressure, engine oil, pressure and temperature, engine indicators, battery, child lock, mirrors, shift gear, lighting, warning indicator signals, navigation system, entertainment system, anti-theft system, windows, camera system, fault codes, failures, and/or other information related to the vehicle.

At block 508, the vehicle monitoring device 130 may transmit the vehicle information. The vehicle monitoring device 130 may transmit the vehicle information to one or more off-board devices 140 via the communication relay device 102. Also, the vehicle monitoring device 130 may transmit the vehicle information directly to one or more of the off-board devices 140 and the communication relay device 102. Oftentimes, a driver may not understand a warning signal generated by the vehicle, the vehicle monitoring device 130 may transmit the vehicle information to a user that may understand the warning signal. For example, an elderly driver may not understand various warning signals (e.g., tire pressure signal) generated on the control panel of a vehicle. The vehicle monitoring device 130 may provide the warning signal to a child, a relative, or an authorized user or an auto technician to be displayed on the off-board device 140 via the communication relay device 102 of the elderly driver. The child or the auto technician may inform the elderly driver the meaning of the warning signal (e.g., tire pressure is low, battery is low, or check engine oil). In another example, parents may want to monitor a driving habit of their children, the vehicle monitoring device 130 may provide the vehicle operating information to the parents to be displayed on the off-board device 140 via the communication relay device 102 of the children.

At block 510, the vehicle monitoring device 130 may receive instructions from one of the off-board device 140 and the communication relay device 102. For example, the vehicle monitoring device 130 may receive instructions directly from the off-board device 140. In another example, the vehicle monitoring device 130 may receive instructions from the off-board device 140 via the communication relay device 102. The instructions may direct the vehicle monitoring device 130 to perform one or more functions on the vehicle. For example, the instructions may direct the vehicle monitoring device 130 to clear any fault codes or warning signals of the vehicle. In another example, the instructions may direct the vehicle monitoring device 130 to change a performance of various components of the vehicle including, engine, transmission, mirrors, lighting, navigation system, entertainment system, anti-theft system, windows, camera system and/or other components of the vehicle.

In one embodiment, the instructions may direct the vehicle monitoring device 130 to adjust a position of the side view mirrors or rear view mirror of the vehicle. In another embodiment, the instructions may direct the vehicle monitoring device 130 to adjust seat (driver, passenger) position of the vehicle. In other embodiments, the instructions may direct the vehicle monitoring device 130 to unlock the doors of the vehicle. The instructions may direct the vehicle monitoring device 130 to lower a revolution per minute of the engine of the vehicle. The instructions may direct the vehicle monitoring device 130 to activate or deactivate turn signals of the vehicle. Also, the instructions may direct the vehicle monitoring device 130 to activate or deactivate windshield wipers of the vehicle. Further, the instructions may direct the vehicle monitoring device 130 to activate or deactivate headlight or high beam of the vehicle. In another embodiment, the instructions may instruct the vehicle monitoring device 130 to apply brakes to the vehicle.

At block 512, the vehicle monitoring device 130 may forward the instructions to the vehicle. For example, the vehicle monitoring device 130 may format or convert the instructions to a protocol of the vehicle and forward the instructions to the vehicle.

At block 514, the method 500 for forwarding vehicle information may end.

FIG. 6 is a flow diagram 600 for forwarding instructions based on the vehicle information in accordance with an embodiment of the present disclosure. This exemplary method 600 may be provided by way of example, as there are a variety of ways to carry out the method. The method 600 shown in FIG. 6 may be executed or otherwise performed by one or a combination of various systems. The method 600 is described below may be carried out by the apparatus and components shown in FIGS. 1-4, by way of example, and various elements of the apparatus are referenced in explaining the example method of FIG. 6. Referring to FIG. 6, at block 602, the method 600 for forwarding instructions based on the vehicle information may begin.

At block 604, the off-board device 140 may retrieve vehicle information. For example, the off-board device 140 may receive vehicle information from the vehicle monitoring device 130 via the communication relay device 102. In another example, the off-board device 140 may receive vehicle information directly from one of the vehicle monitoring device 130 and the communication relay device 102. For example, the vehicle information may include data related to speed, revolution per minute (RPM), fluid temperature and pressure, temperature, tire pressure, engine oil, battery level, child lock, mirrors, shift gear, lighting, warning indicator signals, navigation system, entertainment system, anti-theft system, windows, camera system, fault codes, failures, and/or other information related to the vehicle.

At block 606, the off-board device 140 may process and display the vehicle information. For example, the off-board device 140 may translate the vehicle information to a communication protocol of the off-board device 140. Thereafter, the off-board device 140 may display the vehicle information to a user of the off-board device 140.

At block 608, the off-board device 140 may receive instructions from a user. For example, a user may input instructions to the off-board device 140 based at least in part on the displayed vehicle information. For example, the off-board device 140 may display a fault code or warning signal of the vehicle. The user may input an instruction to clear the fault code or the warning signal of the vehicle. Also, the user may provide instruction to provide a definition of the fault code or warning signal of the vehicle. For example, a low tire pressure signal may be displayed on the off-board device 140. The user may provide instructions to define the low tire pressure signal. In another example, an engine service light may be displayed on the off-board device 140. The user may provide instructions to inform the driver to take the vehicle in for service. The user may inform the driver who owns the communication relay device 102 as to the condition of the vehicle and how to fix it.

In another example, the user may input instructions to change a performance of various components of the vehicle including, engine, transmission, mirrors, lighting, navigation system, entertainment system, anti-theft system, windows, camera system and/or other components of the vehicle. For example, the off-board device 140 may display a speed of the vehicle of 70 MPH. The user may input instructions to decrease the engine RPM to slow down the vehicle. In another example, the off-board device 140 may display a destination address in the navigation system. The user may input instructions to change the destination address in the navigation system. The off-board device 140 may display a volume of the entertainment system. The user may input instructions to lower the volume of the entertainment system in order to reduce the distraction to the driver. In other examples, the off-board device 140 may display that the driver is making a phone call using the Bluetooth communication system of the vehicle. The user may input instructions to disconnect the phone call.

At block 610, the off-board device 140 may process the received instructions. For example, the off-board device 140 may translate the received instruction into a communication protocol that is compatible with the communication relay device 102 and/or the vehicle monitoring device 130. For example, the off-board device 140 may determine a communication protocol based at least in part on the vehicle information received from the communication relay device 102 and/or the vehicle monitoring device 130. The off-board device 140 may translate the received instruction to the same communication protocol as the received vehicle information.

At block 612, the off-board device 140 may transmit the instructions to the vehicle monitoring device 130. For example, the off-board device 140 may transmit the instruction to the vehicle monitoring device 130 via the communication relay device 102. In another example, the off-board device 140 may transmit the instruction directly to the vehicle monitoring device 130.

At block 614, the method 600 for forwarding instructions based on the vehicle information may end.

In accordance to an embodiment of the present disclosure, either the processor 230 and telecommunications circuitry 225 in the communication relay device 102, or the processor 320 and communications circuitry 316 in the vehicle monitoring device 130, or the processor 402 and the wireless communication module 238 in the off-board device 140, may generate one or more communications protocols with which the devices may communicate with one-another. The communications circuit can be implemented either in hardware, or in software, or in a combination of hardware and software. Typical communications protocols generated by the communication circuit include but are not limited to: SAE J1850 (VPM), SAE J1850 (PWM), ISO 9141-2, and ISO 14230-4 ("Keyword 2000"). The present invention is not intended to be limited to any specific communications protocol, or even to electrical communications protocols. Other present and future protocols, such as fiber optic and wireless communication protocols, are also contemplated as being within the scope of the present invention.

The vehicle information received from the vehicle diagnostic system 150 may be processed in the vehicle monitoring device 130, the communication relay device 102, the off-board device 140 or a combination thereof. If the vehicle monitoring device 130 processes the vehicle information, the vehicle information may be communicated to the communication relay device 102 and/or the off-board device 140 via the interface circuitry 306 and the interface port 220 in a format, corresponding to the vehicle information, ready to be viewed on a display. Also, the vehicle monitoring device 130 may translate the vehicle information and communicate the vehicle information to the communication relay device 102 via the interface circuitry 306 and interface port 220 to the processor 230 of the communication relay device 102. The processor 230 may process the vehicle information and then displays the information to the user on the display 106.

In an alternative embodiment, the communication relay device 102 may be configured to retrieve the vehicle information from the existing vehicle diagnostic system 150 in any of the methods described above. The communication relay device 102 may not have diagnostic software downloaded and stored in its memory 215 but can download it, nor in the memory of the vehicle monitoring device 130. The communication software stored in the communication relay device 102 may be for gathering the information from the vehicle diagnostic system 150. The vehicle information may be communicated by the communication relay device 102 to the off-board device 140. The off-board device 140 may display the received vehicle information to a user.

The user may monitor the vehicle information displayed on the off-board device 140, or take the off-board device 140 to a parts supplier who can look at the vehicle information and provide the user with the necessary parts to correct the fault or error. In addition the user can communicate with a driver having the communication relay device 102 and inform the driver of issues related to the vehicle based on the vehicle information.

While the present invention has been illustrated by the description of embodiments thereof, and while the embodiments have been described in some detail, it is not the intention of the applicant to restrict or in any way limit the scope of the appended claims to such detail. Additional advantages and modifications will readily apparent to those skilled in the art. For example, a cellular phone that is permanently mounted in a vehicle can be equipped with the technology of the present invention and perform the functions of the off-board device. Another example is manufacturer installed circuitry in the vehicle connected to the vehicle data bus, wherein the circuitry automatically monitors the vehicle diagnostic system and notifies the vehicle manufacturer or dealer of any problems. The user simply receives a courtesy call from the dealer to bring the vehicle in for service. As yet another example, although specific circuitry has been shown for the cellular phone, the present invention is intended to encompass virtually any cellular phone circuitry in combination with the adaptor circuitry to implement an off-board device. Therefore, the invention in its broader aspects is not limited to the specific details, representative apparatus and methods, and illustrative examples shown and described. Accordingly, departures may be made from such details without departing from the spirit or scope of the applicant's general inventive concept.

The invention claimed is:

1. A computing device for receiving a vehicle diagnostic information, comprising:
    a processor configured to receive a diagnostic trouble code from a vehicle diagnostic system of a vehicle that was forwarded by a vehicle monitoring device;
    a diagnostic software configured to retrieve the diagnostic trouble code, analyze the diagnostic trouble code to provide fixes based on the diagnostic trouble code and encrypt instructions sent to the vehicle diagnostic system, wherein the software includes information to service a vehicle based on an altitude of where the vehicle is located, and wherein the processor determines if the diagnostic software running on the computing device is a correct diagnostic software for the vehicle;
    a display configured to display a camera system of the vehicle;
    a memory configured to store the diagnostic software, a database having instructions, and software to operate the computing device, wherein the database include instructions to the vehicle monitoring device to cause a vehicle's navigation system to change destinations;
    a signal translator that communicates in various vehicle communication protocols;
    instruction interface that communicates with other devices and to transmit the encrypted instructions sent to the vehicle diagnostic system based on the fixes; and
    a housing that houses the processor, the diagnostic software, the display, the memory, the signal translator and the instruction interface.

2. The computing device of claim 1, wherein the encrypted instructions include instruction to clear diagnostic trouble code from the vehicle diagnostic system.

3. The computing device of claim 1, wherein the encrypted instructions include instruction to clear warning signals.

4. The computing device of claim 1, wherein the encrypted instructions include instruction not related to fixes and to control a light in the vehicle.

5. The computing device of claim 1, wherein the encrypted instructions include instruction not related to fixes and to control an anti-theft system of the vehicle.

6. The computing device of claim 1, wherein the encrypted instructions include instruction not related to fixes and to control a mirror of the vehicle.

7. The computing device of claim 1, wherein the encrypted instructions include instruction not related to fixes and to control exterior lights of the vehicle.

8. The computing device of claim 1, wherein the encrypted instructions include instruction not related to fixes and to control indicator lights of the vehicle.

9. The computing device of claim 1, wherein the encrypted instructions include instruction not related to fixes and to control the camera system of the vehicle.

10. The computing device of claim 1, wherein the encrypted instructions include instruction not related to fixes and to control a window of the vehicle.

11. A computing device for receiving a vehicle diagnostic information from a vehicle, comprising:
    a processor configured to receive the vehicle diagnostic information from a vehicle diagnostic system of the vehicle that via a vehicle monitoring device;
    a diagnostic software configured to retrieve the vehicle diagnostic information, analyze the vehicle diagnostic information to provide fixes and encrypt instructions sent to the vehicle diagnostic system, and wherein the processor determines if the diagnostic software running on the computing device is a correct diagnostic software for the vehicle based on a received vehicle identification number;
    a display configured to display a camera system of the vehicle;
    a memory configured to store the diagnostic software, a database having instructions, and software to operate the computing device, wherein the database include instructions to the vehicle monitoring device to cause a vehicle's navigation system to change destinations;
    a signal translator that communicates in various vehicle communication protocols;
    instruction interface that communicates with the vehicle monitoring device and to transmit the encrypted instructions sent to the vehicle diagnostic system; and
    a housing that houses the processor, the diagnostic software, the display, the memory, the signal translator and the instruction interface.

12. The computing device of claim 11, wherein the encrypted instructions include instruction to clear a diagnostic trouble code from the vehicle diagnostic system.

13. The computing device of claim 12, wherein the encrypted instructions include instruction to clear warning signals.

14. The computing device of claim 11, wherein the encrypted instructions include instruction to control a light in the vehicle.

15. The computing device of claim 11, wherein the encrypted instructions include instruction to control an anti-theft system of the vehicle.

16. The computing device of claim 11, wherein the encrypted instructions include instruction to control a mirror of the vehicle.

17. The computing device of claim 11, wherein the encrypted instructions include instruction to control exterior lights of the vehicle.

18. The computing device of claim 11, wherein the encrypted instructions include instruction to control indicator lights of the vehicle.

19. The computing device of claim 18, wherein the encrypted instructions include instruction to control the camera system of the vehicle.

20. The computing device of claim 11, wherein the encrypted instructions include instruction to control a window of the vehicle.

* * * * *